United States Patent [19]
Del Villar

[11] Patent Number: 5,284,402
[45] Date of Patent: Feb. 8, 1994

[54] SYSTEM FOR THE MANUFACTURE AND INSTALLATION OF SELECTIVE INTAKE TOWERS IN RESERVOIRS

[76] Inventor: Antonio C. Del Villar, Pedro Rico, 31- 28029 Madrid, Spain

[21] Appl. No.: 18,461

[22] Filed: Feb. 16, 1993

Related U.S. Application Data

[63] Continuation of Ser. No. 898,913, Jun. 12, 1992, abandoned.

[30] Foreign Application Priority Data

Jun. 12, 1991 [ES] Spain ................... 9101405

[51] Int. Cl.5 ................................ E02B 7/32
[52] U.S. Cl. .................... 405/127; 405/80; 405/87
[58] Field of Search ............ 405/87, 80, 107, 108, 405/204, 127

[56] References Cited

U.S. PATENT DOCUMENTS

| | | | |
|---|---|---|---|
| 873,581 | 12/1907 | McQueen | 405/204 X |
| 875,699 | 1/1908 | Dumais | 405/204 |
| 1,310,461 | 7/1919 | Williams | 405/204 |
| 1,758,606 | 5/1930 | Jacobs | 405/204 X |
| 3,464,212 | 9/1969 | Yamagata et al. | 405/204 |
| 3,537,268 | 11/1970 | Georgii | 405/204 X |

FOREIGN PATENT DOCUMENTS

| | | | |
|---|---|---|---|
| 0003908 | 1/1982 | Japan | 405/127 |
| 0015711 | 1/1982 | Japan | 405/127 |
| 0297620 | 12/1988 | Japan | 405/127 |

*Primary Examiner*—Dennis L. Taylor
*Attorney, Agent, or Firm*—McAulay Fisher Nissen Goldberg & Kiel

[57] ABSTRACT

The system consists in producing an underwater foundation (1) in the appropriate place, close to the dam (2), in the vertical line of said foundation (1) producing a floating platform (4), with buoyancy that can be regulated, and on this platform (4) proceeding with the manufacture of the tower (6–7), by means of a continuous concreting process, up to the moment when said tower is capable of floating alone, given its hollow nature, at which moment the floating platform (4) can be removed and from which time the tower becomes increasingly submerged in step with the increase in the length of its shaft (7), by means of supplying water (8) to its inside, until the said tower is totally finished, at which moment it is positioned by means of a greater supply of water which may be removed if it is necessary to correct errors in positioning, and after said definitive positioning the tower is also definitively ballasted or rendered stationary, the control and command elements for the gates or valves for the various intake points and for discharge being produced therein, the windows or orifices of which have been protected by means of protective shields during production and assembly of the tower.

11 Claims, 4 Drawing Sheets

SYSTEM FOR THE MANUFACTURE AND INSTALLATION OF SELECTIVE INTAKE TOWERS IN RESERVOIRS

This is a continuation of application Ser. No. 07/898,913, filed Jun. 12, 1992 now abandoned.

DESCRIPTION

1. Subject of the Invention

The present invention relates to a novel system for the manufacture and installation of selective - intake towers for water, in reservoirs which are being exploited, which does not require temporary emptying of the said reservoirs.

2. Background of the Invention

The quality of the water stored in a reservoir is influenced by various factors, and, of these, the following may be mentioned:

Development of organisms in the reservoir.
Penetration of light into the water.
Temperature of the water at different depths.
Chemicals present in the water.
Shape of the reservoir.
Presence of fine sediments (turbidity currents).
Fluctuations in level of the reservoir.
Wind action.
Presence of trees, shrubs and topsoil in the reservoir.
Presence of floating objects.

Currently, the harnessing of water in reservoirs increasingly requires the construction of devices which make it possible to select the intake level as a function of the quality of the water required for various uses.

It is in those reservoirs intended for supplying water for human consumption that this need is especially felt, owing to the effect that the quality of the harnessed water has on the health and hygiene of the inhabitants in the population centers which are supplied, as well as owing to the repercussions that said quality has on the costs of treatment required to render the harnessed water drinkable.

For this reason, it is in this type of reservoir where there are customarily selective intake points for water, that is to say harnessing devices that make it possible to select the intake level as a function of the quality exhibited by the water at different depths.

However, the increase in the standard of living experienced over the last few years, growing ecological awareness and current concern for the quality of the environment have demonstrated the need or desirability of having selective intake points in reservoirs intended for other uses.

In fact, frequently, reservoirs intended for the supply of water for irrigation empty flows into the river which are harnessed downstream, at variable distances from the dam, and are diverted towards the irrigation channels. In these cases, inadequate quality of the water tapped from the reservoir may endanger ecosystems existing in the section of river included between the dam and the diversion site, thus making it necessary to arrange selective intake points in the reservoir so that the most suitable harnessing level can be chosen at all times.

Thus, it is generally necessary or desirable to have selective intake points available in the following types of reservoir:

Those intended for supplying population centers.
Those intended for irrigation purposes and multiple uses, if the quality of the water tapped and conveyed along the irrigation channels may endanger ecosystems existing in the river downstream of the dam.

Currently, intake which enable the water to be harnessed at different depths, called selective intake points, may be classified as four basic types:

Intake tower.
Inclined tower.
Obhidra.
Telescopic tower.

Each of these types of selective intake - undoubtedly has a particular area of application, yet the "intake-tower" type is the most widespread and the one of which there are more examples worldwide due, probably, to the act that the intake tower is the simplest device to exploit, the safest and most versatile in all types of reservoirs, but especially in those of greater depth and, therefore, which require a greater number of intake levels.

When new dams are constructed and they need to have selective intakes available, there are generally no special constructional problems. However, there is an increasing need to have this type of intake - available in reservoirs which have already been built and are being exploited, either owing to the desirability of improving the quality of the supply, or owing to the need to exploit part of the reserves of the reservoir for supply purposes for which it was not initially designed.

In these cases, there are two possibilities: that of construction under dry conditions, following emptying of the reservoir, and that of constructing the intake - tower under the normal exploitation conditions of the reservoir.

Currently, the solution which is most commonly adopted is that of emptying the reservoir, building the intake site under dry conditions and then proceeding to re-stock the reservoir. However, this solution involves many varied drawbacks amongst which the following should be highlighted:

Direct costs of the operations of emptying and filling the reservoir.
Indirect costs of emptying and filling if these operations involve temporary shutdown of existing exploitation sites: hydroelectric developments, supply to industries, etc.
Damage caused to the fauna sheltered by the dam and its surrounding environment.
Cost of the necessary measures and actions to be implemented in order to correct or alleviate ecological damage caused.
Risk involved with respect to guaranteed supply of demands in seasons following construction of the site.

The importance of the drawbacks described in the previous paragraph mean that the system based on emptying the reservoir is not always feasible.

When this happens, it is necessary to undertake construction procedures with the reservoir full or at the required exploitation level.

Under these conditions, currently used construction procedures pose constructional problems which are difficult to solve, which limit the scope of the intake (difficulty of reaching certain flows) and the versatility thereof (practical limitation of the number of intake levels). As a consequence, the costs of execution are considerably increased and, at the same time, the periods involved in constructing the sites are extended.

Recently, with the aim of solving the problem, a constructional procedure was designed which consists essentially in constructing the tower on the basis of slices prefabricated away from the reservoir, these slices being placed on top of each other, using underwater means, in the appropriate place at the bottom of the reservoir.

With this system, a series of constructional joints are produced, discontinuities which, in many cases, subsequently need to be made watertight if the intended purpose of the tower requires it to be leakproof (case of towers with intakes via tubing closed with valves).

It is, in any case, necessary to give the vertical framework of the slices continuity, so that the tower operates as a monolithic vertical structure.

Although this solution is very attractive in principle and undoubtedly possible to execute, it nevertheless raises the following main points:

The desirability of reducing the number of slices as far as possible.

The need to set up, under water, a system for making points between slices watertight to guarantee that the latter are leakproof, with the high pressures of water produced by the reservoir.

The need to integrate the joints between slices so that the shaft of the tower operates as a continuous structure.

With respect to the first point, it is necessary to reach a technical and economic compromise between the elements involved: crane capacity, cost of diving hours, structural desirability of minimising the number of slices, etc.

Leakproofing of the joints between slices may be solved by means of the grouting of suitable products, with the prior creation of small leakproof spots in the joints, produced by means of rubber seals.

As for the continuity of the vertical framework, this may be obtained by fitting rounds into ducts molded into the slices, grouting then being performed in these ducts.

It thus appears that the points posed by this solution could be resolved with the technical means which are available today.

However, the need to base the system on underwater operations involves:

The difficulty of working underwater to place the slices.

The difficulty of adapting to the actual conditions of the reservoir and the dam.

The difficulty of correcting errors in positioning.

The lack of flexibility in the event of unforeseen circumstances.

The difficulty of controlling the quality of the construction produced.

The increase in price of the site.

The lengthening of performance periods.

As a consequence of all the aforesaid, in practice this system does not provide a satisfactory solution to the problem posed.

DESCRIPTION OF THE INVENTION

With the novel system for the manufacture and installation of selective intake towers in reservoirs, which forms the subject of the present invention, the set of problems described above is solved quite satisfactorily, said system being applicable to any type of reservoir, with any type of dam, with any type of control for the selective intakes with any geometry for the tower, with no limitation as to the flow of said intakes points and it being possible, moreover, to take said intakes independently by gravity or by pumping, that is to say by means of new or already existing conduits passing through the dam, or by pumping the water over said dam.

To this end, and more specifically, the novel system for the manufacture and installation of selective intake towers, proposed by the invention, is based on the production of the corresponding foundation, using any conventional means and in the place provided for the construction of the tower, obviously close to the dam, then proceeding with the mooring or immobilisation of a floating platform, in line vertically with the said foundation, the platform having buoyancy that can be regulated, for example, by means of pneumatic chambers assisted by corresponding valves.

This floating platform forms the operating base for executing the rest of the manufacturing process, which consists in the continuous concreting of the footings and of the first few meters of the shaft of the tower until such time as the tower is capable of floating by itself, given that it must normally have the configuration of a hollow cylinder which is open at the top, so that once the height of the shaft is sufficient for the tower to float alone, launching thereof then ensues by means of removal of the floating platform.

However, said platform may assume an annular or other type of configuration and be maintained at the time of launching, being released from the tower and acting as a "guide" for vertical penetration thereof into the water.

Next, and in step with the increase in height of the shaft, the tower is ballasted with water so that it becomes progressively submerged and so that the working zone above it, that is to say the zone of continuous concreting, continues to be maintained at a suitable level for the concrete to be supplied from the dam, always ensuring that its center of gravity is located below the center of the submerged part, until the shaft reaches its definitive total length or height. Finally, the tower is positioned on the foundation by means of flooding the tower with water and, if corrections in positioning are necessary, it may be refloated by removing water from its interior. After achieving final and definitive positioning, the tower is ballasted and, if appropriate, a supplementary mooring is installed, either to the lower foundation or to the actual dam.

To complement this, and as is obvious, the water inlets or intake points are produced in the tower, during the continuous concreting process, at levels and with diameters which are both appropriate for the anticipated flows, advantageously fitted with grilles and temporarily covered with exterior closure seals, preferably made from metal, as well as with metal fittings for subsequent fitting of the corresponding gates, the shields being removed following the process of manufacture and installation of the tower.

Next, and if the water is not removed by pumping but by gravity, the tower is connected up to the discharge ducts for the harnessed flows, using, for this purpose, either ducts which already exist in the dam or new ducts made therein.

The process is concluded with the fitting of the gates, of the mechanisms for actuating and control thereof and of any other type of accessory which is deemed desirable, the tower being left ready for commissioning.

DESCRIPTION OF THE DRAWINGS

In order to supplement the description being given and with the aim of assisting better comprehension of the features of the invention, the present specification is accompanied, as an integral part thereof, by a set of drawings which, with an illustrative and nonlimiting character, show the following.

PREFERRED EMBODIMENT OF THE INVENTION

From an examination of these figures, it may be observed how the manufacturing and installation system which is proposed is based on the construction of the corresponding foundation (1), preferably next to the internal wall of the dam (2), at the same time as the production, above the surface of the water (3) of the reservoir, of a floating platform (4) which, in accordance with a purely illustrative embodiment of the invention, may be made as a metal float, of suitable dimensions to support the tower to be manufactured, said float being subdivided internally into a series of leakproof compartments communicating with the outside by means of flexible tubing which can be opened and closed by means of valves with the aim of regulating its buoyancy.

Figure 2:
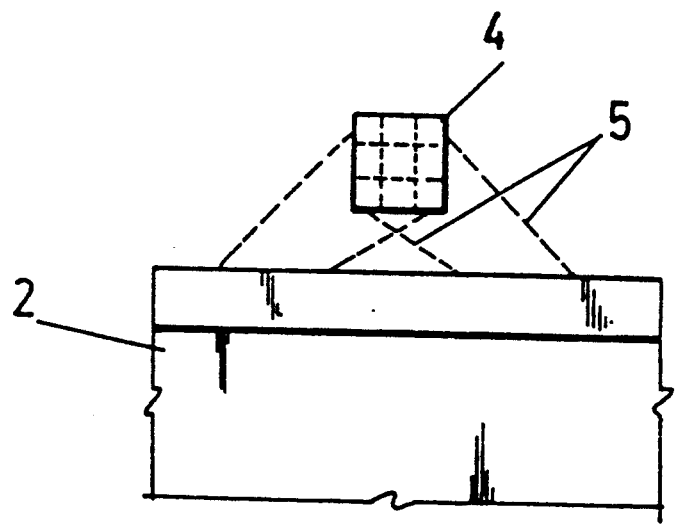
FIG. 2 shows a plan view of the whole shown in the previous figure.

This platform (4) is fastened advantageously to the dam (2) with the collaboration of moorings or anchorages (5), as may be observed in FIG. 2, anchorages which must permit the vertical oscillation movements of the actual reservoir as well as the downward displacement of said platform as the tower is manufactured thereon, only the drifting of the platform being prevented.

Figure 1:
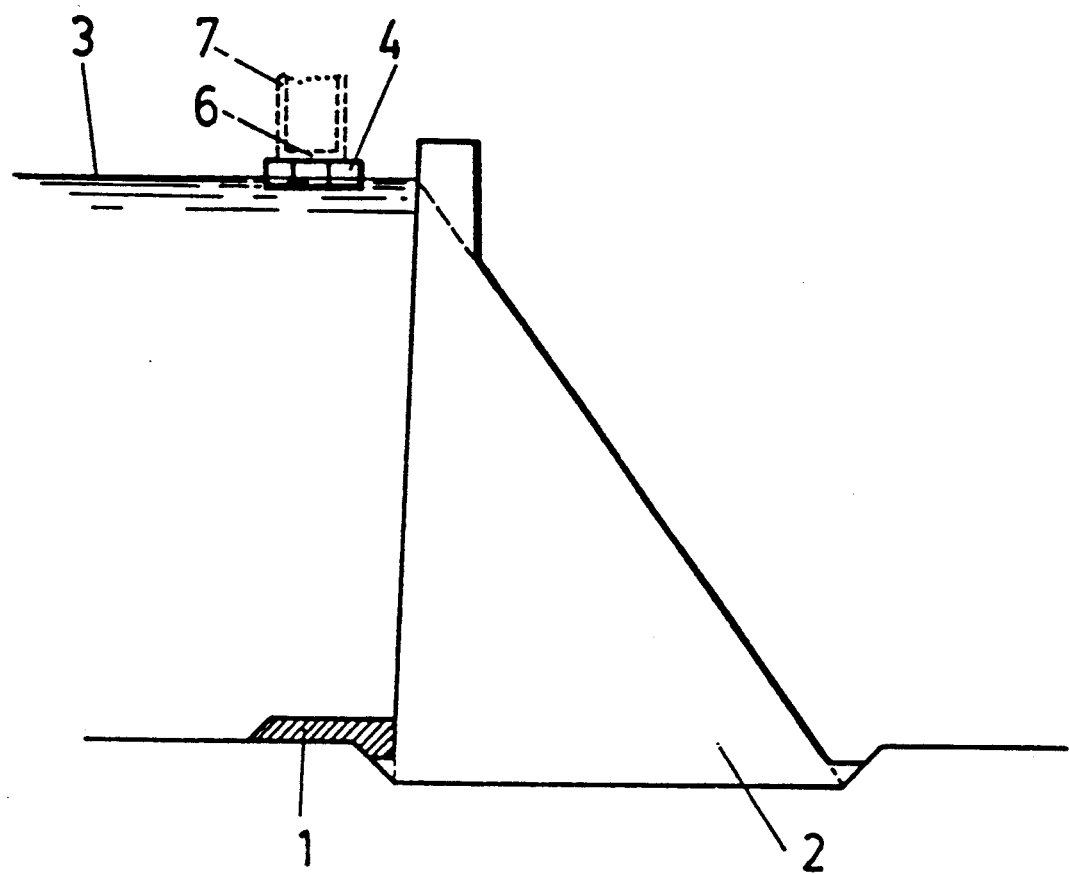
FIG. 1 shows a diagrammatic view in lateral elevation and in cross-section of a dam in which the initial phases have been carried out for putting the system for the manufacture and installation of selective intake towers, which constitutes the subject of the present invention, into practice, and more specifically the foundation phase and the production of the floating platform.
Figure 3:
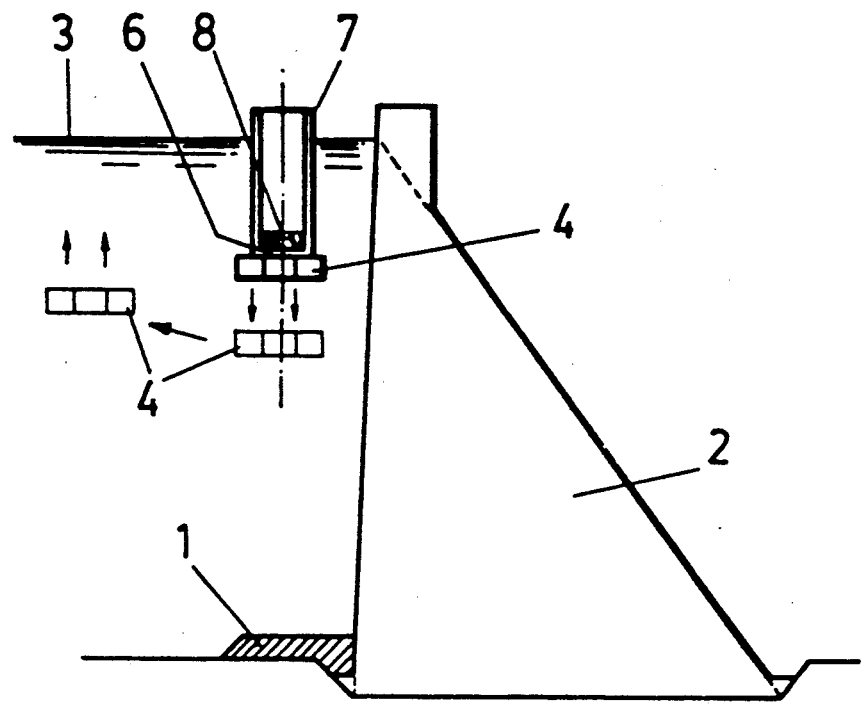
FIG. 3 shows, in a diagrammatic view similar to that in FIG. 1, a point in the process in which the tower is being launched.
Figure 4:
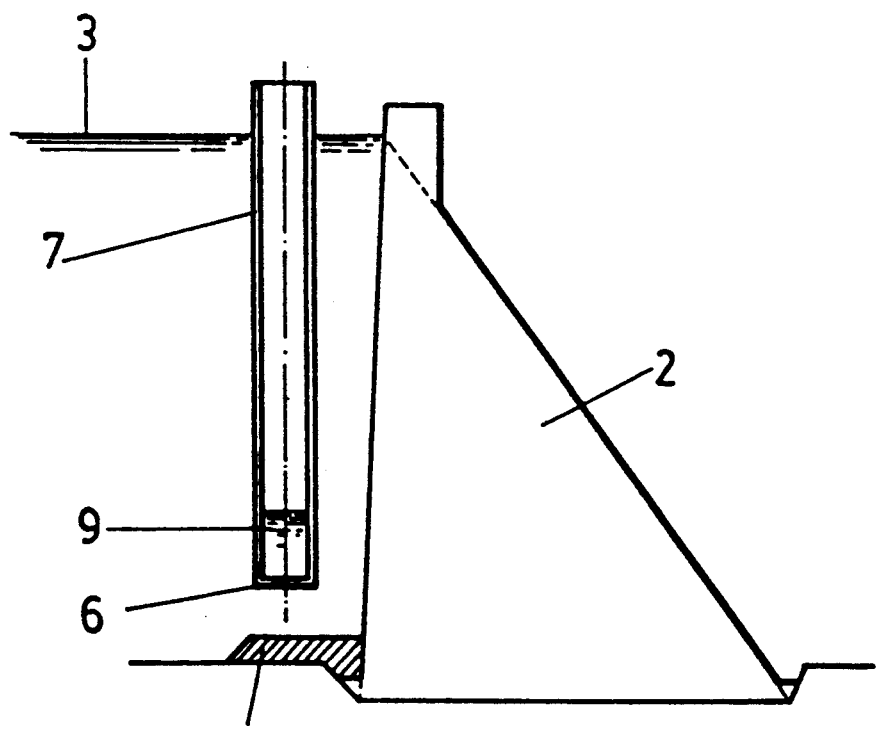
FIG. 4 shows a view similar to that in FIG. 3 but with the shaft of the tower totally finished and ready to effect positioning thereof.

Once the platform (4) has been duly constructed, a continuous concreting process is used to make the footings (6) of the tower and of the shaft or lateral and annular wall (7) thereof, which will grow progressively, as may be observed in FIGS. 1, 3 and 4.

Having reached the point when the height of the shaft (7) is sufficient for the tower, which is hollow and open on the inside, to be capable of floating by itself, the floating platform (4) is removed, as has been shown diagrammatically in FIG. 3, from which point the buoyancy of the tower is controlled by means of interior ballasting thereof, specifically by means of supplying a variable mass of water (8) which will be all the greater, the greater the height of the shaft.

Figure 5:
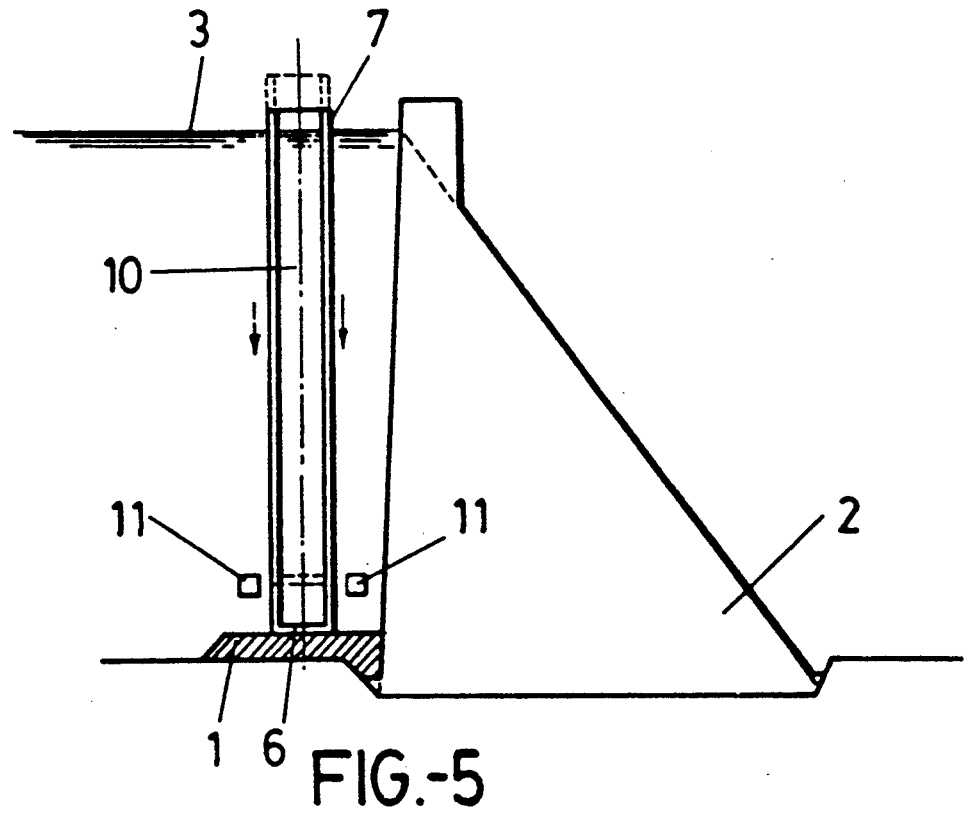
FIG. 5 shows a view similar to that in FIG. 4 during the positioning thereof.

Total finishing of the said shaft (7) of the tower is thus achieved, as shown in FIG. 4, at which point the tower may be supplied with an interior ballast (9), for example of concrete, with a weight which can vary as a function of the length of the tower, in order next to moor the latter, as shown in FIG. 5, by means of filling it totally with a mass of water (10), this manoeuvre being controlled preferably with the collaboration of television cameras (11) which have been shown diagrammatically in the said FIG. 5.

Figure 6:
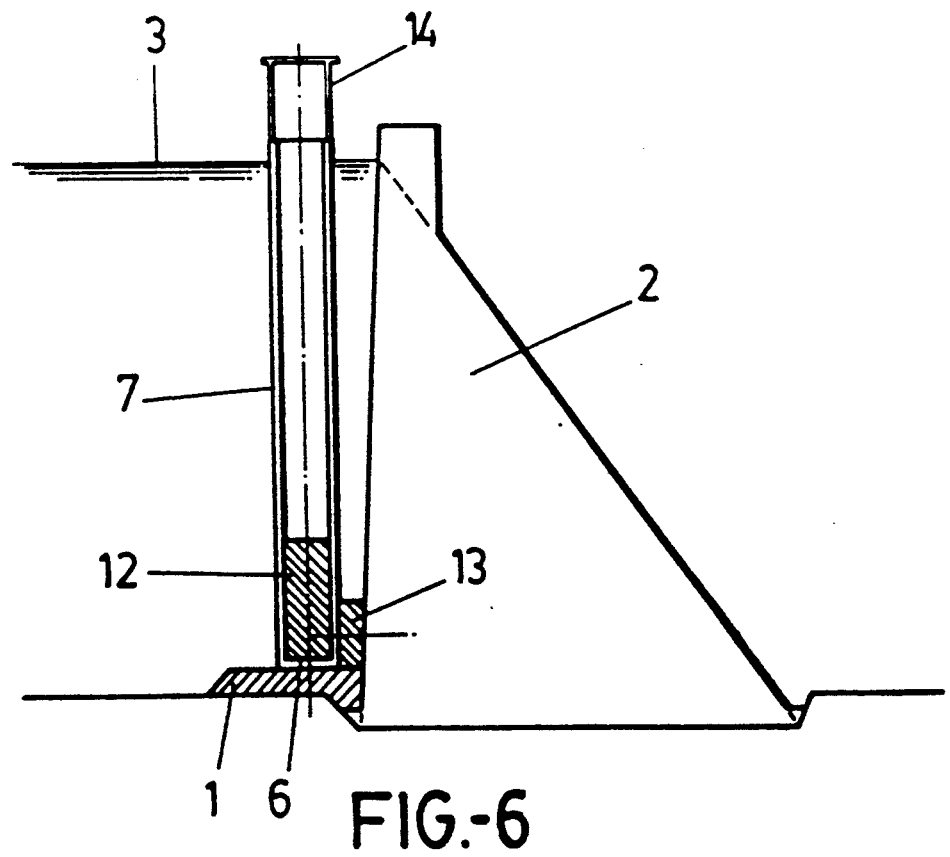
FIG. 6 shows a view similar to that in previous figures and corresponding to the final stage of ballasting and finishing the tower.

Following definitive positioning of the tower (7), the similarly definitive ballasting (12) thereof is performed, also cementing, and at a lower level, the gap (13) which remains between the actual tower and the dam (2), as may be observed also in FIG. 6, it being possible for the tower to be topped by a chamber (14) where the means for actuating and inspection thereof are set up.

Figure 7:
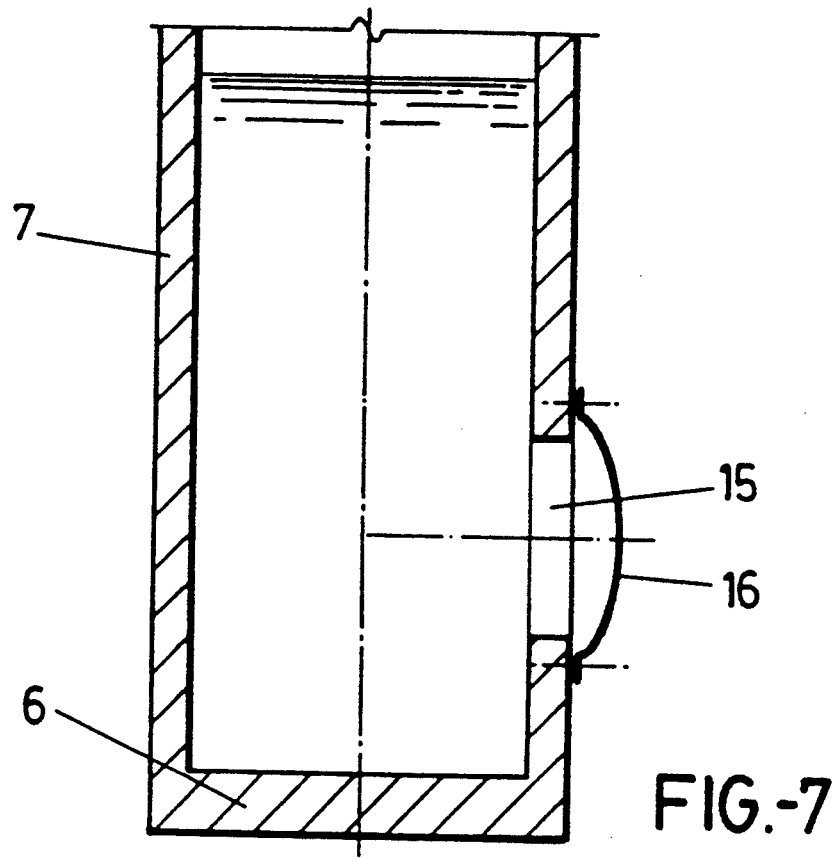
FIG. 7 shows a detail, in elevation and in cross-section, corresponding to one of the shields for temporary protection of one of the apertures of the tower.
Figure 8:
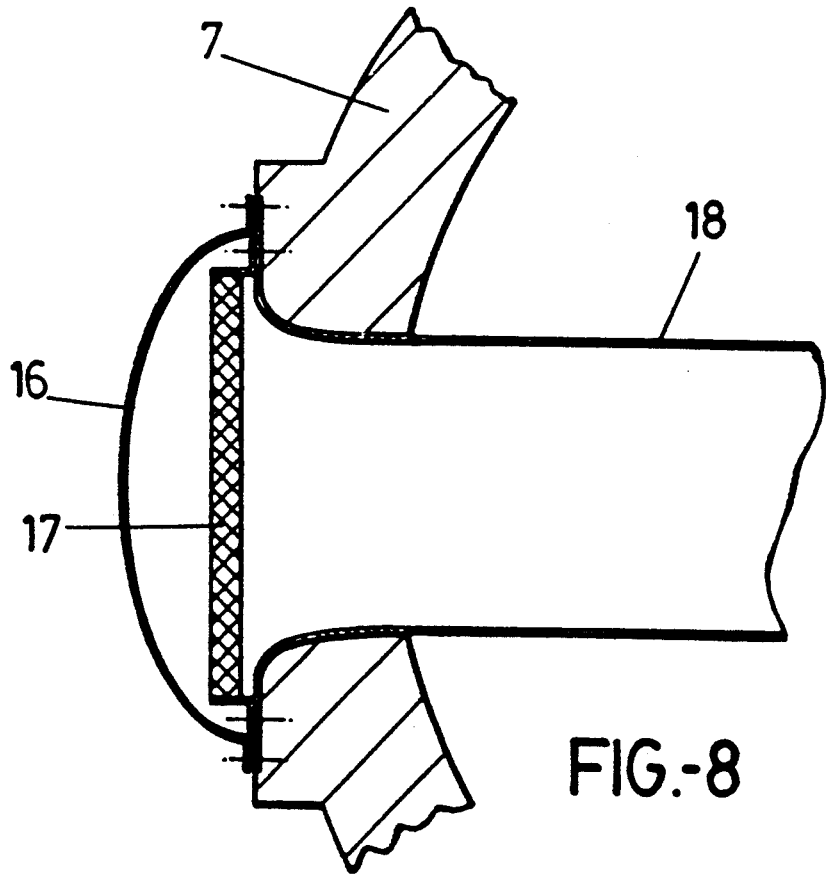
FIG. 8 shows a detail, in plan view and in cross-section, at the level of one of the connection-window orifices, the window orifices, the window being provided with the corresponding sampling tubing, grille and protective shield.

During the continuous concreting process, as is essential and has already been indicated previously, the windows (15), of suitable size and position for the various intake points in the tower and, as appropriate, suitable for the outlet or discharge conduit, will be produced in the shaft or lateral wall (7) of the tower, these windows 15) remaining temporarily protected by means of closure shields (16), as is clearly visible in FIG. 7, and, specifically, the windows corresponding to the said intake points being provided with the conventional grille (17) and with the optional presence of inlet tubing (18) along which the corresponding control valve will be set up, although, as stated previously, it is possible for these windows not to have inlet tubing, the corresponding gate being produced directly therein, the means for control and actuation for said valves and/or gates being set up, in any case, inside the tower.

As has been stated repeatedly, discharge of the water from the interior of the tower may take place via pumping, although it will normally be performed by gravity, in which case the corresponding discharge window (15) will be connected advantageously to a preexisting duct in the actual dam (2) or to a duct which has been advantageously made therein, with a diameter suited to the anticipated discharge flow.

The system for manufacture and installation described, used generally to solve the problem of constructing selective intake towers of water in reservoirs which are being exploited, without the need to empty the latter, offers, inter alia, at least the following advantages:

Simple manufacture of the tower.
Absence of constructional joints.
Guaranteed leakproof nature of the tower, if its exploitation requires this.
Structural safety due to the monolithic nature of the tower manufactured.
Very considerable reduction in underwater operations compared with existing systems.
Very strict geometrical tolerances.
Maximum safety for operators involved in its execution.

Great flexibility and capacity for adaptation to the actual conditions of the reservoir, thus minimising the possibility of unforeseen circumstances.

Great accuracy in laying out and positioning the tower in the reservoir.

Great simplicity for correcting possible errors of manufacture and positioning in the reservoir.

Maximum facility to control the quality of the conditions of manufacture and assembly in the reservoir.

Low cost, compared with existing systems.

Short performance period, compared with existing systems.

It is not considered necessary to expand this description for any expert in the field to appreciate the scope of the invention and the advantages derived therefrom.

The materials, form, size and arrangement of the elements may be varied, provided this does not constitute a modification of the essential nature of the invention.

The terms in which this description has been given must always be taken in their widest and nonlimiting sense.

I claim:

1. A method for constructing and installing a reservoir intake tower in a reservoir, the tower being constructed proximate a dam, while maintaining the operability of the reservoir, comprising the steps of
   a) providing a platform having an adjustable buoyancy;
   b) constructing a footing having an outer wall on the platform, the footing and outer wall forming a hollow tower with a water-tight bottom at the point where the footing meets the outer wall such that the tower and platform float;
   c) adjusting the buoyancy of the tower to submerge the platform and a portion of the tower;
   d) lengthening the unsubmerged portion of the outer wall to a height such that the tower can float of its own accord without the benefit of the platform;
   e) separating the tower from the platform;
   f) adding water to the interior of the tower to maintain the center of gravity of the tower below its midpoint and increase the length of the submerged portion of the tower;
   g) further extending the outer wall of the unsubmerged portion of the tower to a final predetermined height; and
   h) positioning and securing the tower to fix it in a position relative to the dam.

2. The method of claim 1 wherein step e) is carried out after step g).

3. The method of claim 1 wherein after separation step e)
   the platform is submerged and positioned below and in contact with the tower; the buoyancy of the platform is adjusted to raise the tower; and water within the tower is removed.

4. The method of claim 1 wherein the outer wall has openings, and wherein the openings are temporarily sealed before submerging the tower.

5. The method of claim 1 which further comprises the step of forming a foundation on the bottom of the reservoir to support the tower.

6. The method of claim 5 wherein step h) comprises securing the tower to the foundation.

7. The method of claim 5 wherein step h) comprises securing the tower to the dam.

8. The method of claim 1 wherein step h) comprises securing the tower to the dam.

9. The method of claim 1 wherein the platform is connected to the dam, the connection allowing vertical movement but not horizontal movement of the platform relative to the dam.

10. The method of claim 1 wherein steps b) and d) are carried out by continuous concreting.

11. The method of claim 1 wherein step h) comprises using underwater cameras to facilitate the securing step.

* * * * *